United States Patent [19]

Klinner

[11] Patent Number: 5,285,622
[45] Date of Patent: Feb. 15, 1994

[54] MEANS AND METHOD OF SECURING AND PROTECTING CROP ENGAGING ELEMENTS

[76] Inventor: Wilfred E. Klinner, Beechwood, Heath Lane, Aspley Heath, Woburn Sands, Milton Keynes, Buckinghamshire MK 17 8TN, United Kingdom

[21] Appl. No.: 847,083
[22] PCT Filed: Jun. 26, 1991
[86] PCT No.: PCT/GB91/01040
  § 371 Date: Apr. 9, 1992
  § 102(e) Date: Apr. 9, 1992
[87] PCT Pub. No.: WO92/03037
  PCT Pub. Date: Mar. 5, 1992

[30] Foreign Application Priority Data

Aug. 14, 1990 [GB] United Kingdom ............... 9017783
Sep. 24, 1990 [GB] United Kingdom ............... 9020775

[51] Int. Cl.$^5$ ............................................ A01D 45/30
[52] U.S. Cl. ....................................... 56/130; 56/220; 56/364
[58] Field of Search ............... 56/127, 128, 130, 220, 56/364, 372

[56] References Cited

U.S. PATENT DOCUMENTS 2,481,652 9/1949 Fort .
3,859,777 1/1975 Doering ..................... 56/364 X

FOREIGN PATENT DOCUMENTS

| 76686 | 4/1983 | European Pat. Off. . |
| 241276 | 10/1987 | European Pat. Off. . |
| 305016 | 3/1989 | European Pat. Off. . |
| WO88/04885 | 7/1988 | World Int. Prop. O. . |
| WO88/05626 | 8/1988 | World Int. Prop. O. . |
| WO89/11784 | 12/1989 | World Int. Prop. O. . |

Primary Examiner—George A. Suchfield
Attorney, Agent, or Firm—Collard & Roe

[57] ABSTRACT

In apparatus comprising a rotor (30) and co-operating crop guide means (21), for selectively harvesting from uncut crops wanted plant parts by combing through the crop with resilient crop engaging elements (1) projecting outwardly from a rotor core structure (32), the inner and outer regions of elements (1) are particularly prone to wear, damage and distortion. By adapting mounting members (11) and/or clamping means (14), made of stiffer and/or more durable material than is provided in the intermediate yielding region of crop engaging elements (1), stronger and more convenient mounting of crop engaging elements may be provided and the shape of the important inner crop engaging profile protected. Alternatively or additionally protection of the susceptible regions, including the distal region of elements (1), may be provided by durable inserts embedded partly or wholly in the material from which resilient crop engaging elements are made.

11 Claims, 3 Drawing Sheets

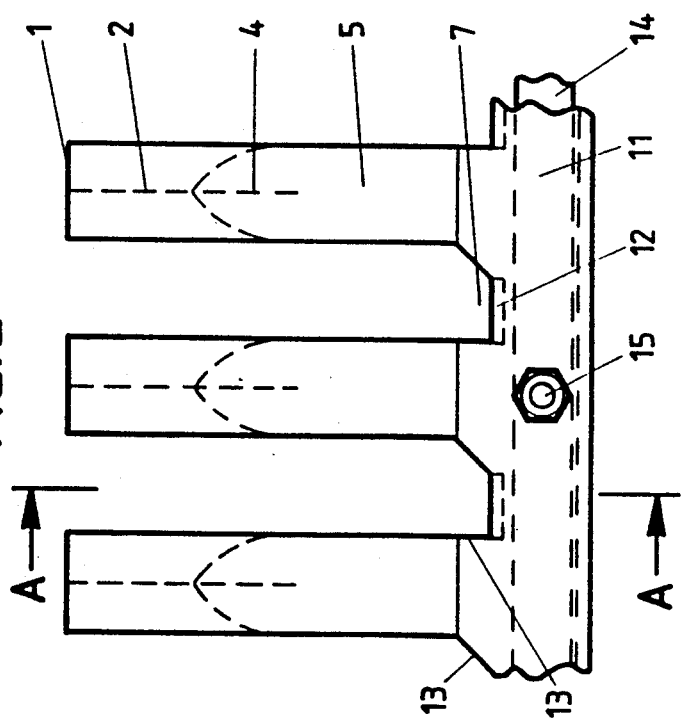
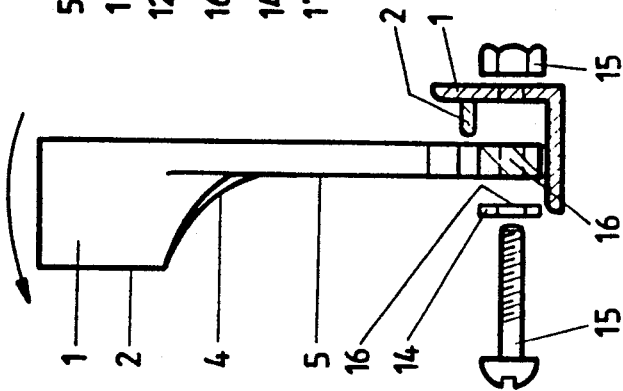
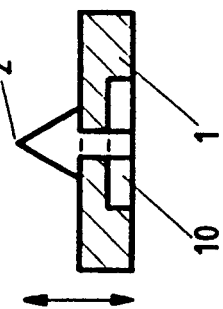
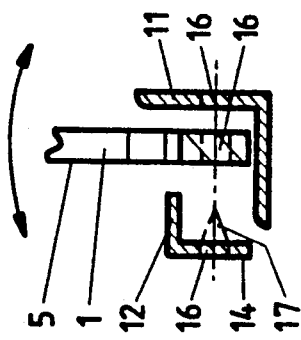
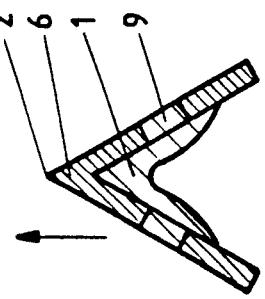
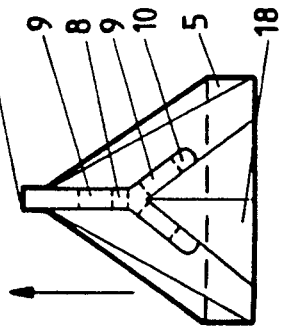
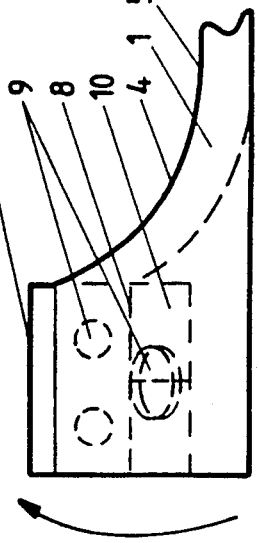

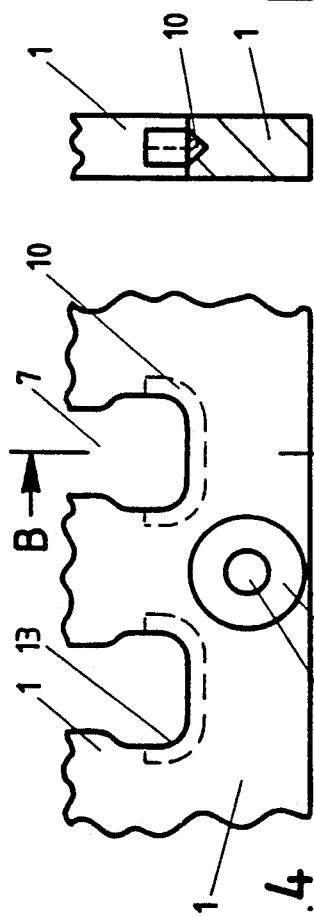
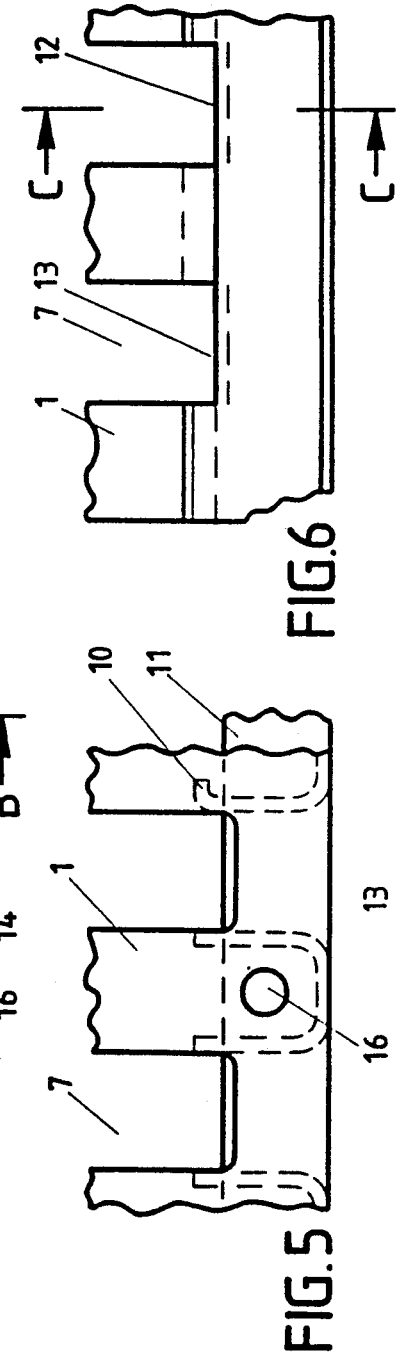
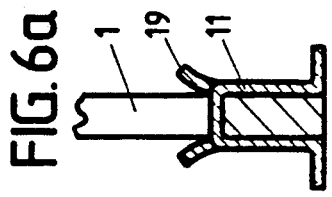
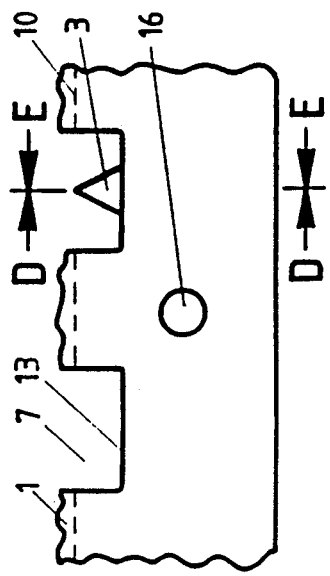
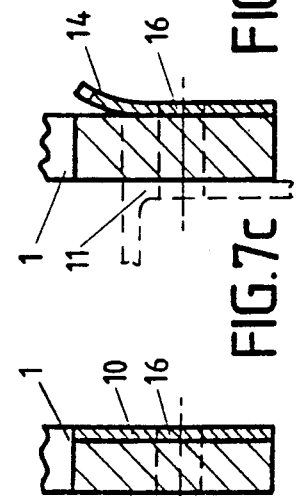

MEANS AND METHOD OF SECURING AND PROTECTING CROP ENGAGING ELEMENTS

The present invention relates to means for, and a method of, securing and protecting crop engaging elements in apparatus for harvesting seed, forage and industrial crops. It is concerned with minimising wear and distortion in the principal regions of the elements where abrasion is greatest and damage occurs most commonly.

The invention has particular application in known apparatus employing high-speed rotors comprising outwardly projecting crop engaging elements attached to inner support means for harvesting certain wanted fractions of grain crops like barley, oats, rice and wheat, also pulses, oil seeds, herbage seeds, flower heads, fruiting bodies and the foliage of forage and other herbage crops. The rotors are provided with cooperating crop guide means so that, when the apparatus is moved through the uncut crop, the elements comb out the wanted plant parts and convey them rearwardly for collection.

Because of the risk of crop engaging elements occosionally striking the ground or foreign objects lying on the ground, elements are usually fashioned from resilient materials, such as natural or synthetic rubbers, semi-rigid plastics and other synthetic compounds. Individual elements may be flat or contoured in their crop engaging regions and may have a variety of profiles.

For convenience of attachment and functional reasons, resilient elements are usually shaped to be flat at the inner mounting region, and they may be formed into laterally extending arrays joined together in strip form. In operation, wear is almost invariably greatest at the inner region between laterally adjacent crop engaging elements, but it can be considerable also in the outer region, particularly at forwardly projecting leading edges or tips.

It is among the objects of the present invention to provide improved means for, and a method of, securing resilient crop engaging elements to mounting members and/or protecting the elements against excessive wear and damage in the most susceptible regions in order to extend service life and maintain efficient operation.

Other objects of the present invention are to increase the convenience and speed of mounting and of replacing crop engaging elements, to increase lateral stiffness for counteracting centrifugal effect between laterally adjacent fastening points, to add to the inner crop engaging profile features which are capable of contributing to the effectiveness of the elements, and to reduce costs by saving on the mass of material provided in the mounting region.

For clarity, in the disclosures which follow, resilient crop engaging element is defined as a member projecting outwardly from a mounting region and adapted for combing through uncut crop, for stripping off wanted plant parts by engagement with the side and inner regions which border recesses between laterally adjacent elements, and for impelling the stripped-off plant parts rearwardly for collection. Each element comprises an inner crop engaging region extending outwardly over a short length of the element where crop density and friction are often greatest, an outwardly adjacent or overlapping intermediate yielding region where bending can take place freely, and an outer or distal region adapted for entering into and dividing naturally disposed uncut crop and guiding it into the inter-element recesses.

For clarity also, in an array of resilient crop engaging elements the inner boundaries, which surround the inter-element recesses between and along the side regions of the inner crop engaging regions of laterally adjacent elements, comprise the inner crop engaging profiles on the stripping rotor. Inner crop engaging regions may extend outwardly preferably between one-tenth and one-half of the length of the elements. Intermediate yielding regions may extend outwardly preferably from one-tenth to over four-fifth of the length of the elements. Inner crop engaging profiles may have different shapes comprising straight and/or curved outlines.

Sustained effectiveness in operation of flexible crop stripping elements depends on maintenance of the inner crop engaging profile and of the three-dimensional shape of the outer crop engaging region.

According to one aspect of the present invention there is provided apparatus adapted for being propelled over the ground comprising a combing rotor and cooperating crop guide means for harvesting wanted plant parts from uncut crop, the combing rotor comprising: a driven core structure; transverse arrays of individual or conjoined outwardly projecting resilient crop engaging elements; circumferentially spaced and laterally extending mounting members attached to the rotor core structure to provide support for the mounting regions of said crop engaging elements; transversely extending clamping means for sandwiching the mounting region or regions of each array of said crop engaging elements against a face of a mounting member; and fastening means for locating and securing said elements and clamping means to said mounting member; wherein, for sustained effective operation of the apparatus, at least the inner crop engaging profiles on said combing rotor comprise regions of complemental components made of stiffer and/or more durable material than is provided in the intermediate yielding regions of said elements.

According to another aspect of the present invention there is provided a method of harvesting crop comprising: propelling through an uncut crop a harvesting apparatus; combing through the uncut crop with transverse arrays of crop engaging elements projecting outwardly on a rotor; detaching from the uncut crop wanted plant parts; and impelling and conveying rearwardly for collection the detached plant parts; the method including the step of protecting at least the inner crop engaging profiles on the combing rotor, for sustained effective operation of the apparatus, by providing correspondingly shaped complemental components made of stiffer and/or more durable material than is provided in the intermediate yielding regions of the crop engaging elements.

The present invention finds application in self-propelled and pushed or pulled tractor-operated harvesting machines.

In accordance with one preferred feature, in embodiments of the invention, an outwardly extending mounting member, for example a flange, may be dimensioned to overlap the inner crop engaging region of the elements being mounted and be shaped in its outer region to form or correspond with an inner crop engaging profile. There may be provided optionally on the mounting member laterally spaced apart lugs formed so that they extend towards the clamping means, preferably at least over the thickness of the resilient material being clamped.

In accordance with another preferred feature, the clamping means may be shaped to provide the profiled outer region and/or lugs extending towards, over or through the mounting member.

The mounting member and clamping means may be made from initially flat strip material or from lengths of angle, channel-section or other profiled bar. In some embodiments the clamping means may comprise washers or other load spreading plates or components. Crop engaging elements may be attached to a leading, trailing or outer face of a mounting member and may be secured by fastening means which are oriented substantially tangentially or radially.

Mounting members and clamping means may be adapted in their outer regions to achieve in combination the desired objectives of supporting the elements and/or protecting the inner crop engaging profiles.

In accordance with a further preferred feature, inner crop engaging profiles may be formed and/or reinforced for protection against wear and damage by inserts of stiff and/or durable material. Such inserts may be partly or wholly embedded in the mounting and/or inner crop engaging regions of the elements and may comprise continuous or intermittently provided laterally extending strips or rods which are shaped to correspond with the required profiles. In some embodiments the inserts may combine with mounting members or clamping means to provide the protection required to maintain the shape of the inner crop engaging profiles.

In accordance with a yet further preferred feature, there may be provided, additionally, protection against wear and damage in the outer crop engaging region of resilient crop engaging elements. Such protection is particularly desirable for forwardly projecting leading edges or tips on elements which have a distal region resembling a tangential wedge, and it may assist in the dividing particularly of tangled crops by mechanisms which may include cutting and splitting. Protection may be provided by stiff and durable inserts which are partly or wholly embedded in the outer region or by hollow or solid outward extensions from the intermediate yielding region.

Preferably, the means for mounting and/or for protecting the inner crop engaging regions of resilient elements do not impair bending of the elements in the regions adapted for yielding. In some embodiments, flaring of the outer regions of externally provided complemental components away from the leading and/or trailing faces of elements at their inner crop engaging regions can remove or minimize risk during yielding of interference with, or of physical damage to, elements by the complemental components.

Embodiments of the invention will now be described by way of example, with reference to the accompanying drawings, in which:

FIG. 2 is a rear elevation of a section of a transverse array of conjoined crop engaging elements mounted and protected in accordance with the invention;

FIG. 2a is a side elevation, partly in section, of the arrangement illustrated in FIG. 2 showing the mounting components spaced apart;

FIG. 2b shows a variation on the mounting arrangement in FIG. 2a;

FIG. 3 is a side elevation of the tangential-wedge-form outer region of a crop engaging element provided with a partly embedded insert;

FIG. 3a is an end elevation of the element shown in FIG. 3;

FIG. 3b is a transverse section of an outer tangential-wedge-form region of a crop engaging element provided with a wear resistant protective casing;

FIG. 3c is an end elevation, partly in section, of a triangular substantially radial and generally planar crop engaging element provided with a wear resistant insert;

FIGS. 4 and 4a show respectively in front elevation and in cross-sectional side elevation crop engaging elements having the inner crop engaging profile reinforced by inserts alone;

FIG. 5 shows inner crop engaging regions of elements reinforced by separate inserts and by the outer region of a mounting member;

FIGS. 6 and 6a are respectively a front elevation and a cross-sectional side elevation of a mounting arrangement employing a hollow mounting member;

FIG. 7 is a rear elevation, and FIGS. 7a, 7b and 7c represent alternative cross-sectional side elevations of FIG. 7 illustrating mounting arrangements comprising embedded inserts or external clamping means formed of sheet material.

Figure 1:
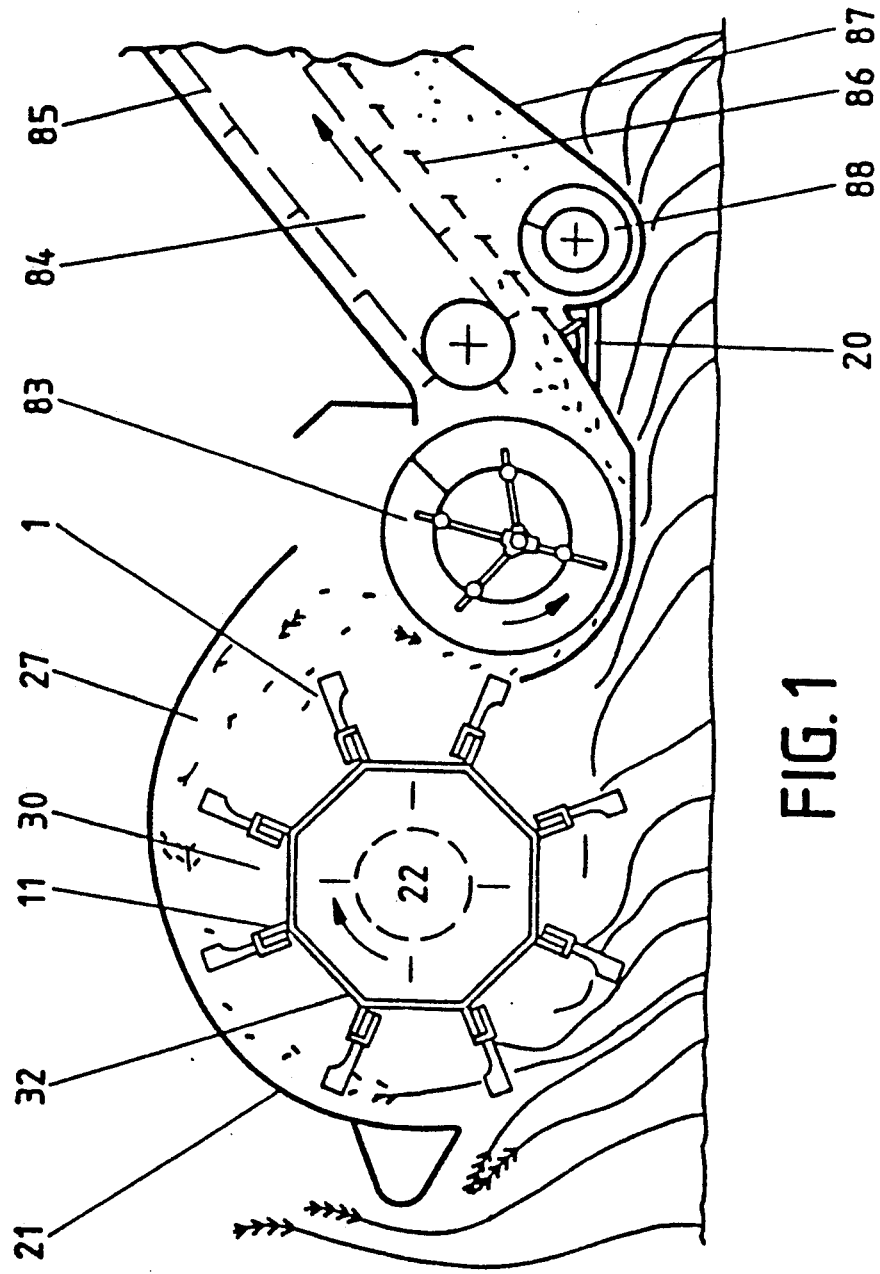
FIG. 1 is a diagrammatic cross-sectional side elevation, partly in section, of a harvester embodying the invention.

Throughout this specification corresponding components of the various arrangements have been given identical reference numerals. For brevity and simplicity the functions and inter-relationships between the various components are described and explained only when they are first mentioned and not fully in connection with each figure. Thus it is to be appreciated that each time corresponding components with identical reference numerals are referred to, the appropriate description applies.

Referring first to FIG. 1, by way of example there is shown in diagrammatic side elevation, partly in section, a generalised layout of a machine embodying the invention, said machine finding application in the harvesting of seeds by stripping them in situ from naturally disposed uncut crop. The apparatus comprises a mobile support structure, or frame, indicated generally at 20, for movement over the ground when pushed or pulled by a tractor, or when attached to a self-propelled power unit.

Connected to frame 20 is a cylindrical rotor core structure 32 of octagonal cross-section, but other forms and shapes of core structure may be provided. Extending outwardly from the core structure 32 are circumferentially spaced mounting members 11 to which are attached in accordance with the invention a plurality of outwardly projecting crop engaging elements 1. The elements may take several different forms. In combination the core structure 32, mounting members 11 and crop engaging elements 1 form a rotary crop stripping device 30. This may be driven by drive means indicated diagrammatically at 22, which may comprise a drive train made up of gears, belts, chains and/or hydraulic means, using power derived conveniently from the engine or motor of the operating unit.

In the embodiment shown, rotation of crop stripping device 30 is such that the crop engaging elements 1 comb through the uncut crop in the upward direction at a front region, splitting the crop mass apart by a wedge action in the direction of rotation. Detachment of wanted plant parts is accomplished by beating, bending, breaking, cleaving, rubbing and tearing the crop mainly with the side regions of elements 1 at peripheral tip speeds in the approximate range of 8 to 40 m/s.

To prevent material detached from the crop by stripping device 30 becoming lost, there is provided a crop guide cover 21; this cover is preferably smoothly curved and extends from in front of the seed stripping region to beyond the rear of stripping device 30. The unobstructed space beneath the cover 21 forms a crop flow passage 27.

Stripped material is directed into a transverse conveying auger 83 which is located in a trough and has series of retracting fingers over at least part of its length. The fingers serve to push the collected material into ducting 84 where an elevator 85, conveniently a slatted chain elevator, conveys it to a higher level for further processing or collection.

When seed crops are harvested by stripping with the harvester shown in FIG. 1, a high percentage of seeds is threshed out by the stripping device 30. This free seed may be separated from any incidentally detached coarse crop fraction through a screen 86 which, conveniently, provides the floor of duct 84. A ramp 87 guids the separated seeds into a transverse conveyor 88, conveniently an auger conveyor, for transfer to one side of the apparatus.

FIG. 2 is a rear elevation of a section of a transverse array of crop stripping elements 1 mounted in accordance with the invention, and FIG. 2a is a side elevation, partly in section, in the direction of arrows AA in FIG. 2.

Crop stripping elements 1 comprise outwardly projecting fingers which are joined together in the mounting region and are each acutely wedge-shaped and provided with a prominent leading edge 2 in the outer region. A rearwardly and inwardly curved ramp 4 connects the outer region with flat intermediate yielding region 5.

Between adjacent fingers extend recesses 7. The inner crop engaging profile between adjacent elements is defined by edges 13 bounding three-sided asymmetrical indentations provided in the outer region of mounting flange 11, which is made of stiff, wear resistant material.

Generally, it is important that any indentation or recess forming or protecting an inner crop engaging profile provides sufficient depth of wear resistant material to prevent wear due to abrasion spreading sideways into the resilient crop engaging elements and, in time, causing the cross-sectional area of elements to be reduced so that failure may result.

In FIGS. 2 and 2a flange 11 comprises the outwardly extending portion of an angle-section mounting bar, as used in the construction of some open-core rotors. To form the indentations bounded by edges 13 defining the inner crop engaging profile, not all the original material has been removed. Some has been formed into optional lugs 12 which extend forwardly towards clamping means 14, preferably by at least the thickness of the resilient material from which elements 1 are made in that region, to provide extra wear protection. For maximum wear protection it may be arranged that the whole of the inner crop engaging profile is lined fore and aft with wear resistant material.

Conveniently, optional lugs 12 also restrain the mounting region of elements 1 from distorting outwardly under centrifugal effect between laterally adjacent fastening bolts 15 which pass through holes 16 in element 1 and in flange 12 and clamping means 14. As shown bolt 15 is held tight by a nut, but, conveniently, other proprietory fastening means may be employed, such as grooved pins and clips or twist or snap fasteners.

Presence of restraining lugs can make it possible to provide relatively wide spacing between laterally adjacent fastening means 15, and this can save time and effort when fitting and replacing elements.

Generally the arrangement disclosed in FIGS. 2 and 2a provides good access for convenient servicing. It can be adapted to securing and protecting individual elements spaced apart on a mounting member.

FIG. 2b illustrates that the clamping member 14 may be provided with the restraining and protecting lugs 12. Optional prongs 17 may be provided between lugs 12 as an additional safeguard against outward movement of the crop engaging elements in operation. In the clamped position prongs 17 may become embedded in the resilient material of the elements, or they may be located in apertures or recesses provided for the purpose.

Provided the outer region of elements 1 is of suitable shape, the means disclosed in the present invention of securing and protecting crop engaging elements allow rotor rotation in either direction.

FIG. 3 shows on a larger scale than in FIG. 2a an outer portion of a wedge-form crop engaging element 1 in which there is provided an insert 8 of durable material to form a wear resistant and aggressive leading edge 2. With reference also to the end elevation shown in FIG. 3a the insert may be provided with apertures 9 to ensure firm bonding to the flexible material of element 1 after moulding. The trailing portion of insert 8 may be divided to form two or more lugs 10 which may be angled in opposite directions in order to secure the insert even more firmly.

As shown, provision of a cavity 18 in the trailing distal region of element 1 saves material, keeps down the mass of the tip portion, and helps to locate the insert prior to moulding.

Other shapes of insert may be provided, or the outer crop engaging region of elements 1 may be covered by or made wholly of more durable material than is provided in the intermediate yielding region of the elements.

FIG. 3b represents a transverse section of an outer tangential-wedge-form region of a crop engaging element in which a wear resistant casing 6 with leading edge 2 is bonded to the resilient material of element 1. Bonding can be enhanced by the provision of optional apertures 9 in which the resilient material may become embedded.

FIG. 3c represents an end elevation, partly in section, of a triangular substantially radial and generally planar crop engaging element 1 provided with a partly embedded wear resistant insert 10. As shown in full outline, insert 10 may extend from one surface of element 1 through to the opposite surface. It may provide, optionally, on the leading surface a wedge-shaped, or, at the tip only, a conical or pyramidal forward projection.

The form of insert shown in FIG. 3c provides protection of the distal region at the centre and between the side edges of element 1. It is effective whether combing rotors are adapted to move the elements upwardly or downwardly at a front region.

In FIGS. 4 and 4a are shown respectively in front elevation and in cross-sectional side elevation in the direction of arrows BB crop engaging elements 1 in which the inner crop engaging regions bounded by edges 13 are reinforced and protected by separate, partly embedded inserts 10 made from lengths of wear resistant rod material of triangular cross-section. Also shown are clamping plate 14 and hole 16 for receiving the fastening means.

Optionally, inserts 10 may be formed of triangular-section rod material so that an edge, instead of a face, bounds the inner crop engaging region. Wear resistant material of other cross-sectional shapes, including flexible spiral material, may be used alternatively for making inserts which may be interconnected optionally.

In FIG. 5 are shown in rear elevation resilient crop engaging elements 1 which have embedded in the mounting region and along the sides of the inner crop engaging regions separate inserts 10 made of wear resistant rod or strip material. Protection of the inner crop engaging profiles is completed by the outer edges of mounting member 11 outwards of the innermost boundaries of elements 1.

FIGS. 6 and 6a represent respectively a front elevation and a cross-sectional side elevation in the direction of arrows CC of a mounting arrangement employing a hollow member 11 for supporting the mounting region of elements 1. The outer surface of member 11 is cut and bent open intermittently on alternate sides to form staggered flanges 19 and providing apertures through which flat elements may be passed to project outwardly. The remaining portions 12 of the outer surface of member 11, together with the sides of flanges 19, protect the inner crop engaging regions 13 of elements 1. Preferably, flanges 19 are flared away from the leading and trailing faces of the elements, to reduce any restriction to yielding and risk of physical damage being caused by the outer edges of the flanges during yielding.

FIG. 7 illustrates generally, in fromt or rear elevation, that inner crop engaging regions 13 may be protected against wear by inserts 10 made of durable sheet material. In FIG. 7a, which is a cross-sectional side elevation of FIG. 7 in the direction of arrows DD, insert 10 is shown to be centrally placed within the thickness of element 1, and in FIG. 7b, which represents a cross-sectional side elevation generally in the direction of arrows EE, insert 10 is bonded into a side face covering the mounting and inner crop engaging regions of element 1.

At 3 is shown an optional extension outwardly of insert 10. Extension 3 may be, but need not be, supported by resilent material from which the elements are made. When it is unsupported, as illustrated in FIG. 7a, it adds a feature to the crop engaging region of elements 1, in the example shown a triangular crop divider. Conveniently, other shapes of additional feature may be provided.

FIG. 7c is an alternative view, generally also in the direction of arrows EE, illustrating a separate clamping plate 14 shaped to correspond with the inner crop engaging profile and curved away from the adjacent face of element 1. Mounting member 11 is indicated in broken outline and provides an inwardly extending mounting flange.

The range of materials from which any of the stiff and/or durable complemental components may be formed include different steels, composite materials, glass and ceramics.

I claim:

1. Apparatus adapted for being propelled over the ground, comprising:
   a combing rotor and co-operating crop guide means for harvesting wanted plant parts from uncut crop, said combing rotor comprising:
   a driven core structure;
   transverse arrays of individual or conjoined outwardly projecting resilient crop engaging elements;
   circumferentially spaced and laterally extending mounting members attached to the rotor core structure to provide support for the mounting regions of said crop engaging elements;
   transversely extending clamping means for sandwiching the mounting region or regions of arrays of said crop engaging elements against a face of a mounting member;
   fastening means for locating and securing said elements and clamping means to said mounting member; and
   at least the inner crop engaging profiles on said combing rotor comprising regions of complemental components made of stiffer or more durable material than is provided in the intermediate yielding regions of said elements, to sustain effective operation of the apparatus.

2. Apparatus according to claim 1, wherein said complemental components comprise said mounting members and/or said clamping means.

3. Apparatus according to claim 1, wherein said complemental components overlap the intermediate yielding region of said crop engaging elements.

4. Apparatus according to claim 1, wherein said complemental components comprise inserts embedded partly or wholly in said crop engaging elements.

5. Apparatus according to claim 1, wherein said crop engaging elements and said complemental components are secured by common fastening means.

6. Apparatus according to claim 1, wherein said complemental components are adapted to extend in part or throughout the inner crop engaging region over some or all of the thickness of the resilient material from which the crop engaging elements are made, to provide maximum protection against wear and to counteract centrifugal effect on the elements in that region.

7. Apparatus adapted for being propelled over the ground, comprising:
   a combing rotor and co-operating crop guide means for harvesting wanted plant parts from uncut crop, said combing rotor comprising:
   a driven core structure;
   transverse arrays of individual or conjoined outwardly projecting resilient crop engaging elements;
   circumferentially spaced and laterally extending mounting members attached to the rotor core structure to provide support for the mounting regions of said crop engaging elements;
   transversely extending clamping means for sandwiching the mounting region or regions of each array of said crop engaging elements against a face of a mounting member;
   fastening means for locating and securing said elements and clamping means to said mounting member; and
   the distal region of said crop engaging elements being protected between its sides against wear, damage or distortion by the provision of forwardly directed projections made of stiffer and/or more durable material than is provided in the intermediate yielding region of said elements.

8. Apparatus according to claim 7, wherein said forwardly directed projections comprise outward extensions from the intermediate yielding region to provide a leading edge, tip or wedge.

9. Apparatus according to claim 7, wherein said forwardly directed projections comprise inserts in the distal region to provide a leading edge, tip or wedge.

10. A method of harvesting a crop comprising:

providing an apparatus for harvesting crops comprising:

a combing rotor and co-operating crop guide means for detaching and collecting wanted plant parts from uncut crop, the combing rotor comprising:

a driven core structure;

transverse arrays of individual or conjoined outwardly projecting resilient crop engaging elements;

circumferentially spaced and laterally extending mounting members attached to the rotor corer structure to provide support for the mounting region of said crop engaging elements;

transversely extending clamping means for sandwiching the mounting region or regions of each array of said crop engaging elements against a face of a mounting member; and fastening means for locating and securing said elements and clamping means to said mounting member;

propelling said apparatus through the uncut crop;

combing through the uncut crop with said driven combing rotor whereby for sustained effective operation of the apparatus at least the inner crop engaging profiles on the combing rotor comprise correspondingly shaped complemental elements made of stiffer and/or more durable material than is provided in the intermediate yielding region of said crop engaging elements; and impelling crop parts detached by combing towards collecting means.

11. A method of harvesting a crop comprising:

providing an apparatus for harvesting crops comprising:

a combing rotor and co-operating crop guide means for detaching and collecting wanted plant parts from uncut crop, the combing rotor comprising:

a driven core structure;

transverse arrays of individual or conjoined outwardly projecting resilient crop engaging elements;

circumferentially spaced and laterally extending mounting members attached to the rotor core structure to provide support for the mounting regions of said crop engaging elements;

transversely extending clamping means for sandwiching the mounting region or regions of each array of said crop engaging elements against a face of a mounting member; and fastening means for locating and securing said elements and clamping means to said mounting member;

propelling said apparatus through the uncut crop;

combing through the uncut crop with said driven combing rotor whereby the distal region of said crop engaging elements is protected between its sides against wear, damage or distortion by providing forwardly directed projections made of stiffer and/or more durable material than is provided in the intermediate yielding region of said elements; and impelling crop parts detached by combing towards collecting means.

* * * * *